United States Patent [19]

Rozsa

[11] 4,094,331

[45] June 13, 1978

[54] DUAL PURPOSE WALKING FRAME FOR HANDICAPPED PERSONS

[76] Inventor: Peter Rozsa, Mazal Dagim 11, Old Jaffa, Jaffa, Israel

[21] Appl. No.: 769,151

[22] Filed: Feb. 16, 1977

[51] Int. Cl.$^2$ .......................... F16M 13/08; A61H 3/00

[52] U.S. Cl. .......................................................... 135/67

[58] Field of Search ........................................... 135/67

[56] References Cited

U.S. PATENT DOCUMENTS

| | | | |
|---|---|---|---|
| 2,708,473 | 5/1955 | Gable et al. | 135/67 |
| 3,176,700 | 4/1965 | Drury, Jr. | 135/67 |
| 3,387,617 | 6/1968 | Reiber | 135/67 |
| 3,387,618 | 6/1968 | Swann | 135/67 |
| 3,421,529 | 1/1969 | Vestal | 135/67 |
| 3,455,313 | 7/1969 | King | 135/67 |
| 3,800,815 | 4/1974 | Birk | 135/67 |

*Primary Examiner*—Werner H. Schroeder
*Assistant Examiner*—Conrad L. Berman
*Attorney, Agent, or Firm*—Browdy and Neimark

[57] ABSTRACT

A dual purpose invalid walking frame for use on walking surfaces and on stairs comprising first support means defining at least three support points lying in two vertically separated planes and arranged to engage two stair surfaces; second support means defining at least three support points lying in a plane and arranged to engage a walking surface, the first and second support means being joined together in a rigid configuration defining a frame; first handle means disposed on the frame at a location suitable for supporting the hands of a person when the first support means are oriented downwardly and in stair engagement; and second handle means arranged on the frame and disposed at a location suitable for supporting the hands of a person when the frame is positioned such that the second support means are disposed downwardly and in engagement with a walking surface.

8 Claims, 4 Drawing Figures

DUAL PURPOSE WALKING FRAME FOR HANDICAPPED PERSONS

The present invention relates to walking frames for handicapped persons suitable for use both in climbing and descending stairs and for walking on relatively flat surfaces.

Walking frames are in common use throughout the world by persons who for one reason or another are unable to support themselves on their legs and require a stable support when walking and ascending or descending stairs. Such persons are often old and infirm and may include post-operative patients having a temporary disability.

Many walking frame devices are known comprising apparatus which may by manual manipulation of one type or another be converted from use on a flat surface to use on stairs. Examples of such devices are U.S. Pat. Nos. 3,176,700, 3,387,617, 3,455,313 and 3,800,815 which show four legged devices including at least two telescopic legs which may be extended or retracted to accommodate either stairs or a flat surface. U.S. Pat. No. 2,708,473 shows an invalid walker having an additional pair of legs which may be extended for use on stairs.

U.S. Pat. Nos. 3,421,529 and 3,387,618 exemplify walking aid appliances which employ members which may be moved into and out of operative engagement depending on whether or not stairs are to be negotiated.

All of the devices described hereinabove have a common disadvantage in that they require some sort of adjustment during use to adapt from a stair mode to a flat surface mode of operation.

Such adjustments usually involve manual manipulation and can be tedious, time consuming, dangerous and even impossible for a large percentage of those persons for whom such a device could be useful.

Such devices additionally involve the risk of improper adjustment or slipping of the various relatively movable members which could cause serious injury to the user.

The present invention seeks to overcome the disadvantages of the prior art devices and to provide a walking frame device which may be used both for stairs and for level surfaces without requiring any adjustment of the frame, other than reorientation thereof.

There is thus provided in accordance with an embodiment of the invention a dual purpose invalid walking frame for use on walking surfaces and on stairs comprising:

first support means defining at least three support points lying in two vertically separated planes and arranged to engage two stair surfaces;

second support means defining at least three support points lying in a plane and arranged to engage a walking surface, said first and second support means being joined together in a rigid configuration defining a frame;

first handle means disposed on said frame at a location suitable for supporting the hands of a person when said first support means are oriented downwardly and in stair engagement; and second handle means arranged on said frame and disposed at a location suitable for supporting the hands of a person when said frame is positioned such that said second support means are disposed downwardly and in engagement with a walking surface.

Further, in accordance with an embodiment of the invention, the first handle means is located at a location suitable for supporting the hands of a person descending stairs and the walking frame also comprises third handle means disposed on said frame at a location suitable for supporting the hands of a person ascending stairs when said first support means are oriented downwardly and in stair engagement.

Additionally, in accordance with an embodiment of the invention said frame may comprise tubular members.

Furthermore, the structure of the frame may comprise first and second tubular member assemblies arranged in a generally upstanding orientation and coupled together by transverse support means.

In accordance with a preferred embodiment of the invention, the first handle means are formed on the second support means and said second handle means are formed on said first support means. Additionally, in accordance with a preferred embodiment of the invention, the first and second handle means are located at recessed positions on the respective second and first support means so as to avoid contact between the first and second handle means and respective walking surfaces and stair surfaces.

Additionally, in accordance with an embodiment of the invention, means are provided for selectably adjusting the vertical separation between the first and second frame members on the one hand, and respective first and second handle means on the other hand, so as to accomodate persons of different body proportions.

Transverse support assemblies 12 and 14 are positioned to limit the forward angular disposition of a person ascending stairs so as to prevent inadvertent backwards falling of such a person when raising the walking frame.

Still, additionally, in accordance with an embodiment of the invention, the first support means may be constructed such that the vertical separation between the two planes in which the support points lie may be selectably adjusted to correspond to varying stair depths.

The invention will be more fully understood and appreciated from the following detailed description taken in conjunction with the drawing in which.

Figure 1:
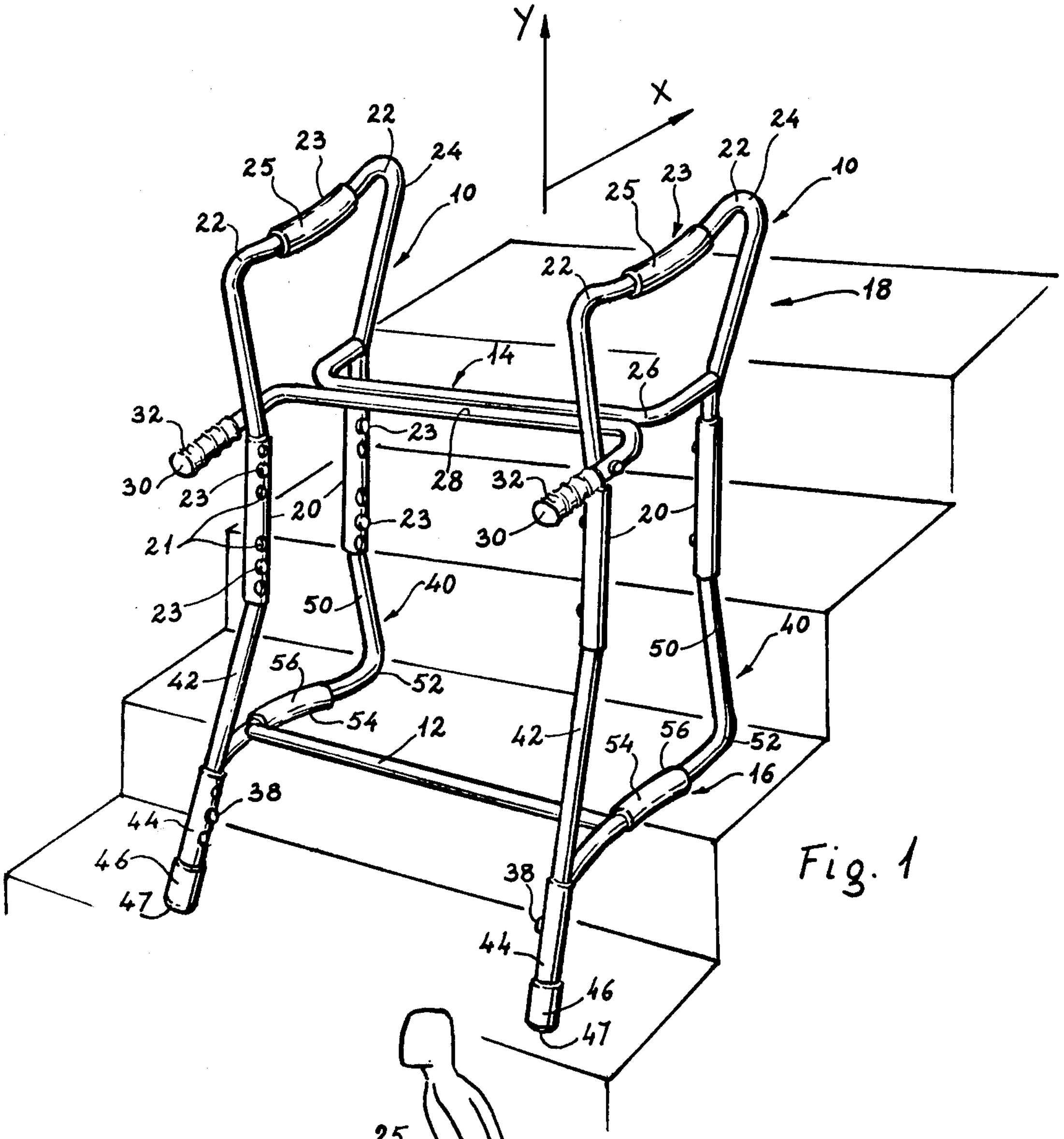
FIG. 1 is a pictorial illustration of a dual purpose walking frame constructed and operative in accordance with an embodiment of the invention.

Referring now to FIG. 1, there is seen a dual purpose walking frame for handicapped persons constructed and operative in accordance with an embodiment of the invention, having a pair of substantially identical generally upstanding tubular assemblies 10 joined by transverse support assemblies 12 and 14 to form a rigid structure which may be considered as comprising first support means 16, being the lower portions of the respective upstanding assemblies 10 and second support means 18 being the upper portions of the respective assemblies 10. It is to be appreciated, of course, as will be described hereinafter in detail that the upper and lower designations here are used for convenience to refer to the embodiment as illustrated in FIG. 1 in the first orientation. It is a major feature of the invention, that orientation of the walking frame can be reversed such that the second support means lies in contact with a walking surface and below the first support means 16.

In the illustrated embodiment, the first and second support means are joined together in a selectable and adjustable relative orientation by means of coupling elements 20.

Figure 3:
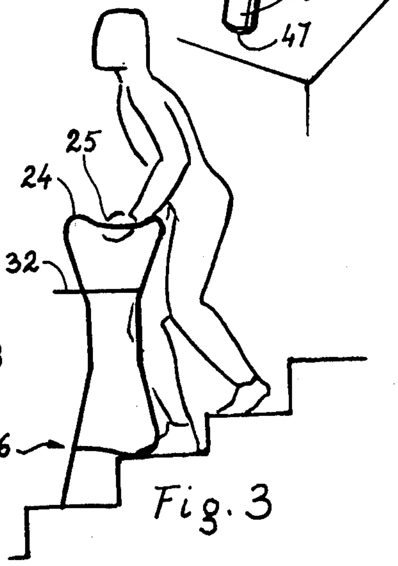
FIG. 3 is a schematic side view illustration of the walking frame of FIG. 1 being used to descend stairs.

Tubular assemblies 10 comprise elements which are typically formed of conventional aluminum tube stock which is readily bent into a desired shape. Tubular elements 24 comprise second support means 18 and are each generally U-shaped with a saddle shaped indentation 23 arranged such that their upper surfaces define end points 22 which lie in a plane on either side of respective indentation 23. At indentation 23 there is provided a rubber or plastic sleeve 25 serving as a frictional surface to facilitate the secure gripping at indentation 23 of the walking frame in a first orientation by a user. As seen in FIG. 3, grips 25 are grasped by a user when using the walking frame for descending stairs.

The generally U-shaped tubular elements forming second means 18 are maintained in generally parallel orientation at a predetermined transverse spatial separation by U-shaped tubular elements 26 and 28 which together comprise transverse support means 14. Tubular member 26 is typically welded at its extreme ends to a side portion of each of the tubular elements 24 while tubular element 28 is fixedly attached to element 26 and bolted or otherwise conventionally secured to the opposite side portions of elements 24 and is further arranged such that its extreme end portions 30 extend in a generally horizontal plane outwardly from assemblies 10 so as to serve as handles. Plastic or rubber sleeves 32 are provided at the end portions 30 to facilitate grasping thereof by a user.

Figure 2:
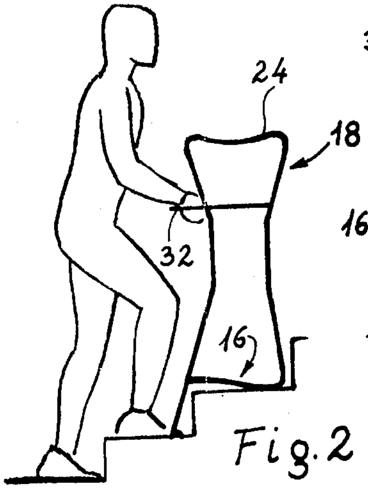
FIG. 2 is a schematic side view illustration of the walking frame of FIG. 1 being used to ascend stairs.

As can be seen in connection with FIG. 2, grips 32 are grasped by a user as he employs the walking frame to ascend stairs.

The first support means 16 comprises a pair of tubular element assemblies 40 each of which includes a tube 42 extending from a coupling element 20 to an adjustable leg coupling element 44 which terminates in a rubber or plastic tipper foot 46 defining support point 47. Coupling element 44 may conveniently comprise a sleeve of aluminum or any other suitable material formed with a plurality of apertures and arranged for engagement with a pin 38 which in turn is attached, in any desired conventional manner such as by threading or by spring loaded mounting, to tube 42. By selecting the aperture through which pin 38 extends, the vertical separation between foot 46 and the remainder of the walking frame can be determined.

It will be appreciated from the discussion which follows that selection of the appropriate coupling foot 46 is made in accordance with the vertical separation of the steps.

First support means 16 also comprises angled members 50 which extend from respective coupling means 20 to support points 52 and then join tubular members 42 just above members 44. The extreme ends of angled elements 50 are joined to respective tubular elements 42 by any suitable conventional means such as bolting or welding. Support points 52 lie in a plane which is generally parallel to the plane defined by feet 46 and spaced therefrom in the vertical direction indicated along the Y axis in the illustration by a distance equivalent to the individual stair height and by a horizontal distance in the direction X indicated in the drawing by a distance approximately equal to or slightly greater than the stair depth. Angled tubular elements 50 are each formed to define an indentation 54 between support point 52 and the junction with tubular element 42.

Figure 4:
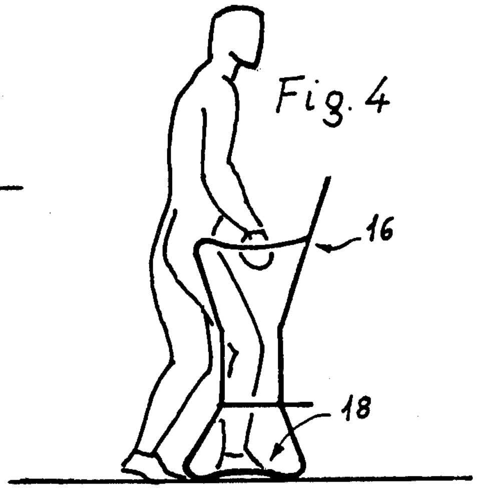
FIG. 4 is a schematic side view illustration of the walking frame of FIG. 1 being used for walking on a generally flat surface.

Sleeves 56 formed of plastic, rubber or any other suitable material are located at respective indentations 54 and serve as support locations for a user's hands when the walking frame is being used for traversing a generally level walking surface as illustrated in FIG. 4.

Coupling means 20 are typically formed of a metal pipe of inner diameter slightly greater than the outer diameter of tubular elements 50, 42 and 22, so as to enable slip-fit engagement therebetween. As seen in FIG. 1 coupling elements 20 are formed with a plurality of spaced location apertures 21 which are suitable for engagement with a locating pin 23 which is fixed to each of the respective ends of the tubular elements which engage the coupling elements. The pins 23 may be removably attached to the respective ends of the tubular elements by threading thereinto or alternatively may be associated therewith by means of a retractable spring mounting.

The design of the coupling means 20 is provided to enable the relative spatial separation between grip sleeves 25 and 32 on the one hand and support points 52 and 47 on the other hand as well as the separation between grip sleeves 54 and support points 22 to be selectable so as to accomodate persons of different heights and arm lengths.

Similarly, the transverse separation of assemblies 10 may be selected to suit particular body proportions.

It is appreciated that many alternative variations of the dual purpose locking frames described hereinabove will occur to persons skilled in the art. For example, embodiments may be constructed in which three support points instead of four may be provided or in which the angular disposition and placement of the various grips may be varied to suit the needs of particular users.

Similarly, it is appreciated that a multiplicity of support points defining a line or surface contact may be provided. Additionally, it is to be noted that embodiments of the invention may be constructed in which all of the various adjustable coupling means are replaced by coupling means which permit substantially no adjustment.

Additionally, adjustable coupling means may be provided in accordance with further alternatives of the invention, for example, to enable adjustment of the angularity of handle 30 with respect to the rest of the frame.

Any suitable type of material or structural design which embodies the features of the invention may alternatively be employed. For example, while it is desirable that the handle grips be indented to prevent them from contacting the stairs on the walking surface, it is not necessary.

Therefore the invention is not limited by what has been particularly shown and described hereinabove but is defined only by the claims which follow:

I claim:

1. A dual purpose invalid walking frame for use on walking surfaces and on stairs comprising:

first support means defining at least three support points lying in two vertically separated planes and arranged to engage two stair surfaces;

second support means defining at least three support points lying in a plane and arranged to engage a walking surface, said first and second support means being fixedly joined together in a rigid configuration to define generally opposite ends of a frame;

first handle means disposed on said frame at a location suitable for supporting the hands of a person descending stairs when said frame is positioned in a first orientation wherein said first support means are oriented downwardly and in stair engagement;

second handle means arranged on said frame and disposed at a location suitable for supporting the hands of a person when said frame is positioned in a second orientation wherein said second support means are disposed downwardly and in engagement with a walking surface; and third handle means disposed on said frame at a location suitable for supporting the hands of a person ascending stairs when said first support means are oriented downwardly and in stair engagement.

2. Apparatus according to claim 1, wherein said frame comprises tubular members.

3. Apparatus according to claim 1, wherein said frame comprises first and second tubular member assemblies arranged in a generally upstanding orientation and coupled together by transverse support means.

4. Apparatus according to claim 1, wherein said first handle means are formed on the second support means and said second handle means are formed on said first support means.

5. Apparatus according to claim 1, wherein said first and second handle means are located at recessed positions on the respective second and first support means so as to avoid contact between the first and second handle means and respective walking surfaces and stair surfaces.

6. Apparatus according to claim 1, wherein means are provided for selectably adjusting the vertical separation between the first and second frame members on the one hand and respective first and second handle means on the other hand so as to accommodate persons of different body proportions.

7. Apparatus according to claim 1, wherein said first support means comprises means for selectable adjustment of the vertical separation between the two planes in which the support points lie to correspond to varying stair depths.

8. Apparatus according to claim 1 and including a transverse structural member positioned so as to limit the forward angular disposition of a person ascending stairs so as to prevent inadvertent backward falling of said person when raising said walking frame.

* * * * *